US011904445B1

(12) United States Patent
Li et al.

(10) Patent No.: US 11,904,445 B1
(45) Date of Patent: Feb. 20, 2024

(54) MANUAL TWEEZERS

(71) Applicant: Shenzhen Sulang Technology Co., Ltd, Shenzhen (CN)

(72) Inventors: Zhengzhong Li, Shaoyang (CN); Wenming Li, Shaoyang (CN)

( * ) Notice: Subject to any disclaimer, the term of this patent is extended or adjusted under 35 U.S.C. 154(b) by 0 days.

(21) Appl. No.: 18/470,211

(22) Filed: Sep. 19, 2023

(30) Foreign Application Priority Data

Mar. 24, 2023 (CN) ......................... 202320670879.5

(51) Int. Cl.
*B25B 9/02* (2006.01)

(52) U.S. Cl.
CPC ...................................... *B25B 9/02* (2013.01)

(58) Field of Classification Search
CPC ........................................................ B25B 9/02
See application file for complete search history.

(56) References Cited

U.S. PATENT DOCUMENTS

| | | | | |
|---|---|---|---|---|
| 216,918 A * | 6/1879 | Wales | B25B 9/02 | 119/806 |
| 4,318,313 A | 3/1982 | Tartaglia | | |
| 4,938,214 A * | 7/1990 | Specht | B25B 9/00 | 606/174 |
| 5,242,203 A * | 9/1993 | Agnew | G04D 1/026 | 294/99.2 |
| 5,407,243 A * | 4/1995 | Riemann | A61B 17/50 | 294/100 |
| 6,202,760 B1 | 3/2001 | Lin | | |
| 9,168,052 B2 | 10/2015 | Garrison et al. | | |
| 11,648,658 B2 | 5/2023 | Liu et al. | | |
| 2007/0175006 A1 | 8/2007 | Chen | | |
| 2013/0226226 A1* | 8/2013 | Garrison | A61B 17/29 | 606/206 |
| 2023/0210664 A1 | 7/2023 | Zhang et al. | | |

* cited by examiner

*Primary Examiner* — Stephen A Vu

(57) ABSTRACT

A manual tweezer, including a main body, a first fixing base, a pushing member, a pull rod, and clamping arms, wherein the first fixing base is arranged on one side of the main body, and the pushing member is movably sleeved on the first fixing base to reciprocate relative to an axial direction of the first fixing base, and wherein the pull rod is respectively provided with a first end and a second end, the first end of the pull rod is fixedly connected to the pushing member, the second end of the pull rod is connected to the clamping arms, and the pushing member drives the pull rod to reciprocate along the axial direction of the first fixing base for driving the clamping arms to open and close. The manual tweezer further includes a silicone sleeve sleeved on the pushing member.

9 Claims, 3 Drawing Sheets

MANUAL TWEEZERS

TECHNICAL FIELD

The present utility model relates to the technical field of daily necessities, and particularly to manual tweezers.

BACKGROUND

Tweezers are a tool used for picking up block medicines, metal particles, hairs, thorns, and other tiny objects. The tweezers can also be used for clamping wires, elements, integrated circuit pins and the like in mobile phone maintenance. There are various types of tweezers and a wide range of applications for tweezers, and therefore, different tweezers would be required in different occasions.

The physical principles involved in tweezers include the lever principle and effects of forces. The fulcrum of most tweezers is exactly the bonding point at the top end, and the entire structure below is a moment arm. The tweezers have no power arm, because the tweezers are a V-shaped structure when regarded as a whole. When we use tweezers to clamp an object, we need to use a large force to clamp the object tight, which shows that tweezers are laborious. Therefore, tweezers are essentially two laborious levers, and when tweezers are used in daily life, the tweezers are usually required to be pressed at a position in close proximity to the object, which affects the user's operating experience.

Therefore, the existing tweezers have problems such as being time-consuming and labor-intensive, being inconvenient to use, affecting user experience, and being easy to be damaged in picking up objects.

SUMMARY

A primary objective of the present utility model is to provide manual tweezers, which aims to solve the problems that the existing tweezers are inconvenient to use, are time-consuming and labor-intensive, and affect user experience and the like.

In order to achieve the above objective, the present utility model provides manual tweezers, comprising a main body, a first fixing base, a pushing member, a pull rod, and clamping arms, wherein the first fixing base is arranged on one side of the main body, and the pushing member is movably sleeved on the first fixing base to reciprocate relative to an axial direction of the first fixing base, and wherein the pull rod is respectively provided with a first end and a second end, the first end of the pull rod is fixedly connected to the pushing member, the second end of the pull rod is connected to the clamping arms, and the pushing member drives the pull rod to reciprocate along the axial direction of the first fixing base for driving the clamping arms to open and close.

In one embodiment, the manual tweezers further comprise a silicone sleeve that is sleeved on the pushing member.

In one embodiment, a plurality of elastic sheets formed by notches are arranged at intervals on one side of the pushing member, one side that is of the elastic sheet and that is facing the first fixing base is provided with a first inclined surface, and one side that is of the first fixing base and that is facing the elastic sheet is provided with a second inclined surface matched with the first inclined surface.

In one embodiment, the manual tweezers further comprise a spring that is partially sleeved on the first fixing base, wherein one end of the spring is abutted against the main body, and the other end of the spring is abutted against the pushing member.

In one embodiment, the manual tweezers comprise a second fixing base, wherein one end of the second fixing base is fixed to the main body, the other end of the second fixing base is fixed to the first fixing base, a limiting groove for limiting the spring is arranged on the first fixing base, and one end of the spring is embedded in the limiting groove.

In one embodiment, the pushing member is provided with a connection seat protruding from an inner wall thereof, a first fixing hole is formed on the connection seat along a horizontal direction of the pushing member, and the pull rod is fixed in the first fixing hole, and wherein a second fixing hole used for setting a bolt and being communicated with the first fixing hole is formed on the connection seat along a vertical direction of the pushing member.

In one embodiment, the first fixing base is provided with a guide groove adapted to the connection seat, and the connection seat is movably arranged in the guide groove.

In one embodiment, an outer wall of the first fixing base is annularly provided with a groove for fixing the silicone sleeve, an inner wall of the silicone sleeve is annularly provided with a protrusion matched with the groove, and the groove and the protrusion are tightly snap-fitted.

In one embodiment, the manual tweezers further comprise a control board and a camera, wherein the control board is arranged inside the main body, and the camera is arranged in proximity to the clamping arms and electrically connected to the control board.

In one embodiment, the manual tweezers further comprise a support arm, wherein the support arm is fixedly arranged on the first fixing base, and the support arm is provided with a first mounting channel for the pull rod to pass through and a second mounting channel for mounting the camera.

The present utility model has the following beneficial effects.

According to the present utility model, instead of driving the tweezers to open and close by pressing both sides of a V-shaped form, the stable opening and closing of the tweezers are realized by the pushing member driving the pull rod to reciprocate along the axial direction of the first fixing base for driving the clamping arms to open and close, such that a user can more simply, conveniently and stably control the tweezers to operate, the operation is more accurate, and the user experience is better.

BRIEF DESCRIPTION OF DRAWINGS

To more clearly illustrate the technical solutions in the embodiments of the present utility model or in the prior art, the drawings required to be used in the description of the embodiments or the prior art are briefly introduced below. It is obvious that the drawings in the description below are only some embodiments of the present utility model, and those of ordinary skill in the art can obtain other drawings according to structures illustrated in these drawings without creative efforts.

Figure 1:
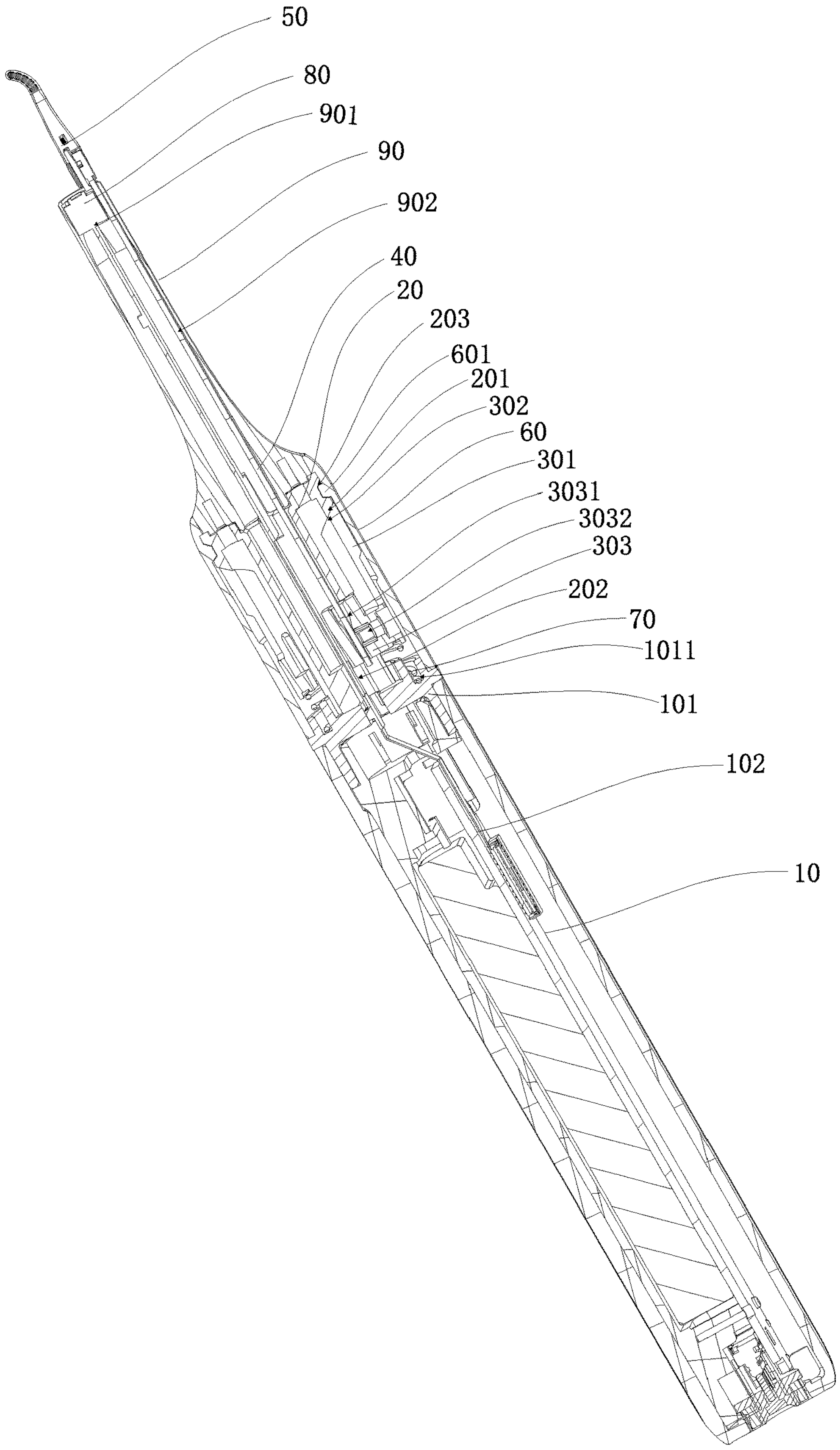
FIG. 1 is a cross-sectional view of manual tweezers according to the present utility model.

DESCRIPTIONS OF REFERENCE NUMERALS main body 10; second fixing base 101; limiting groove 1011; control board 102; first fixing base 20; second inclined surface 201; guide groove 202; groove 203; pushing member 30; elastic sheet 301; first inclined surface 302; connection seat 303; first fixing hole 3031; second fixing hole 3032; pull rod 40; clamping arm 50; silicone sleeve 60; protrusion 601; spring 70; camera 80; support arm 90; first mounting channel 901; and second mounting channel 902.

The realization of the objectives, the functional features, and the advantages of the present utility model will be further explained in conjunction with the embodiments and with reference to the drawings.

DETAILED DESCRIPTION OF EMBODIMENTS

The technical solutions in the embodiments of the present utility model will be clearly and completely described below with reference to the drawings in the embodiments of the present utility model. It is apparent that the described embodiments are only some, but not all, embodiments of the present utility model. Based on the embodiments of the present utility model, all other embodiments obtained by those of ordinary skill in the art without creative efforts fall within the protection scope of the present utility model.

It should be noted that, if directional indications (such as upper, lower, left, right, front and rear) are involved in the embodiments of the present utility model, the directional indications are only used to explain the relative position relationships, the motion situations and the like between individual components under a certain pose (as shown in the drawings), and if the certain pose is changed, the directional indications are changed accordingly.

In addition, if there are descriptions relating to “first”, “second” and the like in the embodiments of the present utility model, the descriptions of “first”, “second” and the like are for descriptive purposes only and are not to be construed as indicating or implying relative importance thereof or implicitly indicating the quantities of technical features indicated. Thus, a feature defined by “first” or “second” may explicitly or implicitly include at least one such feature. In addition, “and/or” appearing herein is meant to include three parallel solutions, and taking “A and/or B” as an example, it includes solution A, or solution B, or both solution A and solution B. In addition, the technical solutions among various embodiments may be combined with each other, however, this combination must be based on that it can be realized by those of ordinary skill in the art. When the combination of the technical solutions is contradictory or cannot be realized, such combination of the technical solutions should not be considered to exist, and is not within the protection scope of the present utility model.

Figure 3:
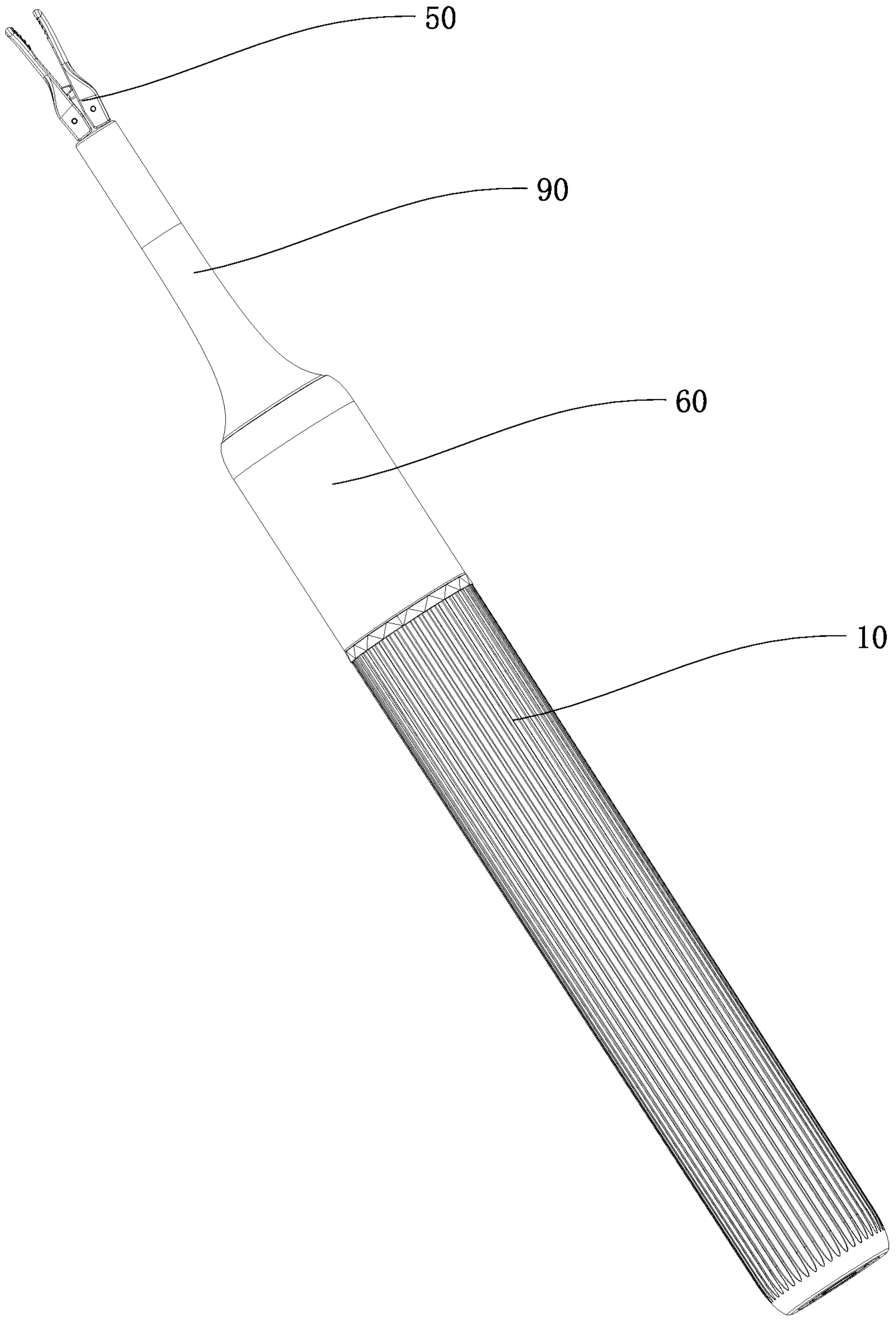
FIG. 3 is a schematic view of a structure of manual tweezers according to the present utility model.

Referring to FIGS. 1 and 3, an embodiment of the present utility model provides manual tweezers, comprising a main body 10, a first fixing base 20, a pushing member 30, a pull rod 40, and clamping arms 50, wherein the first fixing base 20 is arranged on one side of the main body 10, and the pushing member 30 is movably sleeved on the first fixing base 20 to reciprocate relative to an axial direction of the first fixing base 20, and wherein the pull rod 40 is respectively provided with a first end and a second end, the first end of the pull rod 40 is fixedly connected to the pushing member 30, the second end of the pull rod 40 is connected to the clamping arms 50, and the pushing member 30 drives the pull rod 40 to reciprocate along the axial direction of the first fixing base 20 for driving the clamping arms 50 to open and close, such that the stable opening and closing of the tweezers are realized, and the tweezers are easy to operate and convenient to use.

Figure 2:
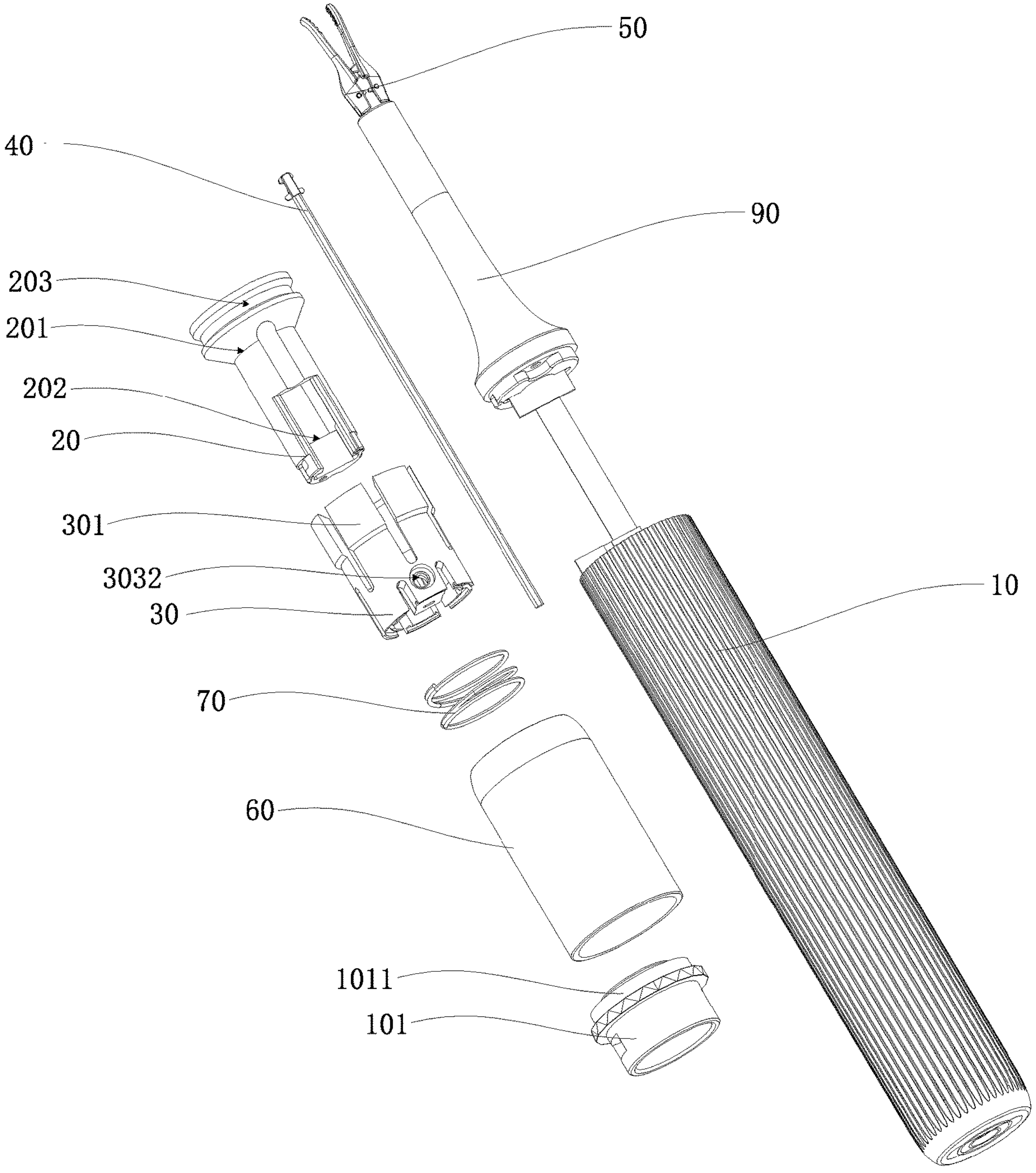
FIG. 2 is an exploded view of a structure of manual tweezers according to the present utility model.

Referring to FIG. 2, the manual tweezers further comprise a silicone sleeve 60, and the silicone sleeve 60 is sleeved on the pushing member 30. The silicone sleeve 60 is generally made from rubber, and is soft and elastic. The silicone sleeve 60 is sleeved on the pushing member 30, such that the tweezers can be protected from being worn and damaged easily and from being invaded by dirt. The silicone sleeve 60 further has an anti-slip effect and can prevent the tweezers from falling accidentally. Additionally, the silicone sleeve 60 has a very good feel and quality, and various designs and colors can be printed on the sleeve by users according to their own preferences, to make the tweezers beautiful and generous in order to meet the users’ personalized requirements. Meanwhile, by sleeving the silicone sleeve 60 on the pushing member 30, the process of pressing the pushing member 30 to drive the clamping arms 50 to open and close can be simpler and more convenient in operation.

Referring to FIG. 1, a plurality of elastic sheets 301 formed by notches are arranged at intervals on one side of the pushing member 30, one side that is of the elastic sheet 301 and that is facing the first fixing base 20 is provided with a first inclined surface 302, and one side that is of the first fixing base 20 and that is facing the elastic sheet 301 is provided with a second inclined surface 201 matched with the first inclined surface 302. In an original state, the clamping arms 50 are in an open state, the first inclined surface 302 is abutted against the second inclined surface 201. When the elastic sheet 301 is subjected to a pressing force, the first inclined surface 302 moves away from the second inclined surface 201 towards an axial direction of the pushing member 30, such that the pull rod 40 is driven to move to drive the clamping arms 50 to close. The user only needs to use a small force at the position of the elastic sheet 301 to easily pick up an object, which is time-saving and labor-saving. Meanwhile, the opening and closing angle of the clamping arms 50 can be controlled by controlling the strength of the pressing force, thereby meeting the application requirements of the tweezers in different scenes.

Referring to FIG. 1, the manual tweezers further comprise a spring 70, and the spring 70 is partially sleeved on the first fixing base 20, wherein one end of the spring 70 is abutted against the main body 10, and the other end of the spring 70 is abutted against the pushing member 30. The spring 70 is a return spring 70. When the pushing member 30 is pressed to move, the pushing member 30 will press the spring 70, thereby compressing the spring 70. When the pushing member 30 is not pressed, the spring 70 in the compressed state is reset, and the spring releases the elastic force to drive the pushing member 30 to reset, such that the tweezers return to the original state, and the spring 70 is prevented from remaining in the compressed state, which may cause damage to the tweezers.

Referring to FIG. 2, the manual tweezers comprise a second fixing base 101, wherein one end of the second fixing base 101 is fixed to the main body 10, the other end of the second fixing base 101 is fixed to the first fixing base 20, a limiting groove 1011 for limiting the spring 70 is arranged on the first fixing base 20, and one end of the spring 70 is embedded in the limiting groove 1011. The limiting groove 1011 limits the position of the spring 70, and the second fixing base 101 is abutted against the spring 70, to prevent the spring 70 from popping out under pressure, causing damage, and affecting the user’s use.

Referring to FIG. 1, the pushing member 30 is provided with a connection seat 303 protruding from an inner wall thereof, a first fixing hole 3031 is formed on the connection seat 303 along a horizontal direction of the pushing member

30, and the pull rod 40 is fixed in the first fixing hole 3031, and wherein a second fixing hole 3032 used for setting a bolt and being communicated with the first fixing hole 3031 is formed on the connection seat 303 along a vertical direction of the pushing member 30. The second fixing hole 3032 is provided with a fixture block protruding from an inner wall thereof and facilitating fixing the bolt, and the pull rod 40 can be fixed to the connection seat 303 only by screwing the bolt tight. When the pushing member 30 is moved, the connection seat 303 and the pull rod 40 will be driven to move together, thereby realizing the objective of driving the clamping arms 50 to open and close by the pull rod such that the stable opening and closing of the clamping arms 50 are realized, and the tweezers are easy to operate and convenient to use.

Referring to FIG. 2, the first fixing base 20 is provided with a guide groove 202 adapted to the connection seat 303, and the connection seat 303 is movably arranged in the guide groove 202. The connection seat 303 horizontally reciprocates in the guide groove 202, and the guide groove 202 defines a movement direction of the connection seat 303 to prevent the connection seat 303 from being turned over.

Referring to FIG. 1, an outer wall of the first fixing base 20 is annularly provided with a groove 203 for fixing the silicone sleeve 60, an inner wall of the silicone sleeve 60 is annularly provided with a protrusion 601 matched with the groove 203, and the groove 203 and the protrusion 601 are tightly snap-fitted, which can prevent the silicone sleeve 60 from dropping, and facilitate removing the silicone sleeve 60 and replacing the worn silicone sleeve 60.

Referring to FIG. 1, the manual tweezers further comprise a control board 102 and a camera 80, wherein the control board 102 is arranged inside the main body 10, the main body 10 is internally provided with a mounting cavity for mounting components such as a main board and a battery, and the camera 80 is arranged in proximity to the clamping arms 50 and electrically connected to the control board 102. The clamping arms 50, the first fixing base 20, the pushing member 30, and the second fixing base 101 are all provided with through holes for mounting electric wires, and the electric wires are connected to one end of the camera 80 and supply power to the camera 80. The design of the camera 80 is convenient for the user to see an operation point clearly when using the tweezers, such that the operation is more accurate. Additionally, a small flashlight can be arranged on the camera 80, such that the user can achieve the above effect even if using the tweezers in a dark environment, which improves the user experience.

Referring to FIG. 1, the manual tweezers further comprise a support arm 90, wherein the support arm 90 is fixedly arranged on the first fixing base 20, and the support arm 90 is provided with a first mounting channel 901 for the pull rod 40 to pass through and a second mounting channel 902 for mounting the camera 80. The first mounting channel 901 limits a movement track of the pull rod 40, which further improves the stability of the movement process of the pull rod 40. The second mounting channel 902 can not only be used for mounting the camera 80, but also be used for mounting other objects such as a light-emitting body, a magnifier, and a laser. The length of the support arm 90 is adjustable, such that the requirements of different scenes on the length of the tweezers can be met under the same force strength.

The above mentioned contents are only optional embodiments of the present utility model and are not intended to limit the patent scope of the present utility model, and under the inventive concept of the present utility model, the equivalent structural transformations made by using the contents of the specification and the drawings of the present utility model, or direct/indirect applications to other related technical fields, are all included in the patent protection scope of the present utility model.

What is claimed is:

1. A manual tweezer, comprising
a main body,
a first fixing base,
a pushing member,
a pull rod, and
clamping arms, wherein
the first fixing base is arranged on one side of the main body, and the pushing member is movably sleeved on the first fixing base, and wherein the pull rod is respectively provided with a first end and a second end, the first end of the pull rod is fixedly connected to the pushing member, the second end of the pull rod is connected to the clamping arms, and the pushing member drives the pull rod to reciprocate along an axial direction of the first fixing base for driving the clamping arms to open and close;
wherein the manual tweezer further comprises a silicone sleeve sleeved on the pushing member.

2. The manual tweezer according to claim 1, further comprising a spring that is partially sleeved on the first fixing base, wherein one end of the spring is abutted against the main body, and an other end of the spring is abutted against the pushing member.

3. The manual tweezer according to claim 2, comprising a second fixing base, wherein one end of the second fixing base is fixed to the main body, an other end of the second fixing base is fixed to the first fixing base, a limiting groove for limiting the spring is arranged on the second fixing base, and one end of the spring is embedded in the limiting groove.

4. The manual tweezer according to claim 1, wherein the pushing member is provided with a connection seat protruding from an inner wall of the pushing member, a first fixing hole is formed on the connection seat along a horizontal direction of the pushing member, and the pull rod is fixed in the first fixing hole.

5. The manual tweezer according to claim 4, wherein the first fixing base is provided with a guide groove adapted to the connection seat, and the connection seat is movably arranged in the guide groove.

6. The manual tweezer according to claim 1, wherein an outer wall of the first fixing base is annularly provided with a groove for fixing the silicone sleeve, an inner wall of the silicone sleeve is annularly provided with a protrusion matched with the groove, and the groove and the protrusion are snap-fitted.

7. A manual tweezer, comprising
a main body,
a first fixing base,
a pushing member,
a pull rod, and
clamping arms, wherein
the first fixing base is arranged on one side of the main body, and the pushing member is movably sleeved on the first fixing base, and wherein the pull rod is respectively provided with a first end and a second end, the first end of the pull rod is fixedly connected to the pushing member, the second end of the pull rod is connected to the clamping arms, and the pushing member drives the pull rod to reciprocate along an axial direction of the first fixing base for driving the clamping arms to open and close;

wherein a plurality of elastic sheets are arranged at intervals on one side of the pushing member, one side of each elastic sheet is provided with a first inclined surface, and the first fixing base is provided with a second inclined surface matched with the first inclined surface.

8. A manual tweezer, comprising a main body, a first fixing base, a pushing member, a pull rod, and clamping arms, wherein the first fixing base is arranged on one side of the main body, and the pushing member is movably sleeved on the first fixing base, and wherein the pull rod is respectively provided with a first end and a second end, the first end of the pull rod is fixedly connected to the pushing member, the second end of the pull rod is connected to the clamping arms, and the pushing member drives the pull rod to reciprocate along an axial direction of the first fixing base for driving the clamping arms to open and close;

wherein the manual tweezer further comprises a control board and a camera, wherein the control board is arranged inside the main body, and the camera is arranged in proximity to the clamping arms and electrically connected to the control board.

9. The manual tweezer according to claim 8, further comprising a support arm, wherein the support arm is fixedly arranged on the first fixing base, and the support arm is provided with a first mounting channel for the pull rod to pass through and a second mounting channel for mounting the camera.

* * * * *